(12) United States Patent
Murashima

(10) Patent No.: US 8,384,831 B2
(45) Date of Patent: Feb. 26, 2013

(54) BROADCAST VIEWING SYSTEM

(75) Inventor: Nobuyuki Murashima, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 784 days.

(21) Appl. No.: 12/374,829

(22) PCT Filed: May 14, 2007

(86) PCT No.: PCT/JP2007/059870
§ 371 (c)(1),
(2), (4) Date: Jan. 23, 2009

(87) PCT Pub. No.: WO2008/012976
PCT Pub. Date: Jan. 31, 2008

(65) Prior Publication Data
US 2009/0195694 A1   Aug. 6, 2009

(30) Foreign Application Priority Data
Jul. 24, 2006   (JP) .................. 2006-200727

(51) Int. Cl.
*H04N 5/44* (2006.01)
*H04N 5/50* (2006.01)
*H04N 7/173* (2006.01)
*G08C 19/16* (2006.01)
*G06F 15/177* (2006.01)

(52) U.S. Cl. ............... 348/734; 348/731; 340/12.14; 725/131; 709/220

(58) Field of Classification Search ............... None
See application file for complete search history.

(56) References Cited

U.S. PATENT DOCUMENTS

| | | | |
|---|---|---|---|
| 6,230,323 B1 | 5/2001 | Hama et al. | |
| 6,466,971 B1 * | 10/2002 | Humpleman et al. | 709/220 |
| 6,662,366 B1 | 12/2003 | Hama et al. | |

(Continued)

FOREIGN PATENT DOCUMENTS

| | | |
|---|---|---|
| GB | 2436701 B | 2/2008 |
| JP | 10-276378 A | 10/1998 |

(Continued)

OTHER PUBLICATIONS

CEC13 CEC Features Description, [online] [retrieval date Nov. 20, 2006] Internet, <URL:http://www.hdmi.org/download/HDMI_Specification_1.1.pdf> pp. CEC-21 to CEC-36.

*Primary Examiner* — Jefferey Harold
*Assistant Examiner* — Sean Haiem
(74) *Attorney, Agent, or Firm* — Birch, Stewart, Kolasch & Birch, LLP

(57) ABSTRACT

In a broadcast viewing system including a television receiver A and a recording/reproducing device B, the television receiver A and the recording/reproducing device B are connected by an HDMI cable. By using a remote control device C on the recording/reproducing device B side, a setting data required for viewing a broadcast is requested by using a control signal from the recording/reproducing device B side, and subsequently, the television receiver A replies with the setting data required for viewing a broadcast to the recording/reproducing device B by a control signal by using data required for viewing a broadcast set in the television receiver A side in advance through the HDMI cable. This simplifies the operation of setting for viewing a television program.

20 Claims, 6 Drawing Sheets

U.S. PATENT DOCUMENTS

| | | | |
|---|---|---|---|
| 6,879,351 B1* | 4/2005 | Brown | 348/734 |
| 7,373,122 B2* | 5/2008 | Kikkoji et al. | 455/186.1 |
| 7,768,421 B2* | 8/2010 | Suzuki et al. | 340/12.14 |
| 7,956,935 B2* | 6/2011 | Chen | 348/734 |
| 2003/0223377 A1* | 12/2003 | Simmons et al. | 370/254 |
| 2004/0031058 A1* | 2/2004 | Reisman | 725/112 |
| 2005/0120383 A1* | 6/2005 | Ozaki et al. | 725/131 |

FOREIGN PATENT DOCUMENTS

| | | |
|---|---|---|
| JP | 2006-93834 A | 4/2006 |
| KR | 2005-0032526 A | 4/2005 |
| KR | 10-2006-0043956 A | 5/2006 |
| WO | WO-2005/006577 A1 | 1/2005 |

* cited by examiner

BROADCAST VIEWING SYSTEM

TECHNICAL FIELD

The present invention relates to a broadcast viewing system, and particularly relates to a broadcast viewing system including a digital broadcast receiver and a recording/reproducing device.

BACKGROUND ART

As the newest standard with general versatility for connecting a plurality of digital household electric appliances, the HDMI standard has been defined. In the HDMI standard, CEC (Consumer Electronics Control) protocol is used. By using the CEC protocol, coordination of the devices connected by the HDMI cables is designed.

TABLE 1

CEC COMMANDS

| COMMON CODE | VENDER UNIQUE CODE |
|---|---|
| Image View On | MENU SETTING TRANSFER |
| Active Source | PROGRAM INFORMATION |
| User Control Pressed | SPECIAL REMOTE CONTROL KEY |
| Record On | DETAILED ERROR NOTIFICATION |
| Record Off | |
| StandBy | |
| Set Stream Path | |
| STANDARD ERROR MESSAGE | |

Table 1 shows examples of CEC commands, and the CEC commands are broadly divided into a common code which is provided for keeping general versatility and is common without depending on each appliance or vender, and a unique code unique to a vender for allowing the degree of freedom, which the vender can uniquely define.

For example, a digital broadcast receiver (TV) and a recording/reproducing device (recorder) are connected with the HDMI cable, and by using the CEC protocol (command), reservation of the recorder can be made by an operation from the digital broadcast receiver side.

Individual setting of the terrestrial analog broadcast channel includes a channel for selecting a station, for example, when pressing a key of "1" of a remote control, for example, any one of 1~62, and C13~C63, a channel displaying when pressing the key of "1" of the remote control, for example, any one of 1~62, and C13~C63, whether or not the channel corresponding to the "1" key of the remote control and has no program is skipped when pressing an up-down station selection key, and fine tune data (± of frequency) used for station selection when pressing the key of "1" of the remote control.

Individual setting of a digital broadcast (BS, CS110 degrees, terrestrial digital) channel includes whether the service of selecting a station when pressing the key of "1" of the remote control, for example, is assigned or not, and the service ID for selecting a station when pressing the "1" key of the remote control, when it is assigned. These are the information necessary for viewing an analog broadcast and a digital broadcast. By setting these items in the devices, processing of viewing of a broadcast and the like is made possible.

DISCLOSURE OF THE INVENTION

Problems to be Solved by the Invention

However, each of the products which have been announced up to now has the problem of requiring to make similar settings in the setting items for viewing as shown in Table 2 by using a remote control Z and a remote control W for both a liquid crystal television and a DVD recorder when a digital broadcast receiver X such as a liquid crystal television, for example, and a recording/reproducing device Y such as a DVD recorder are connected with the HDMI cable as shown in FIG. 8, and a program is viewed.

The present invention has an object to simplify a setting operation for viewing.

Means for Solving the Problem

According to one aspect of the present invention, there is provided a broadcast viewing system including a first device and a second device which are capable of two-way communication, characterized in that a request signal for setting data

TABLE 2

SETTING FOR VIEWING

AREA CODE SETTING (ARIB STB-B10 AREA CODE)
PREFECTURE CODE SETTING (ARIB STB-B10 PREFECTURE DESIGNATION BIT MAP)
ZIP CODE SETTING
AREA IDENTIFICATION SETTING (ARIB TR-B14 AREA IDENTIFICATION ASSIGNMENT)
TERRESTRIAL ANALOG BROADCAST CHANNEL INDIVIDUAL SETTING
   CHANNEL FOR SELECTING STATION WHEN PRESSING PREDETERMINED REMOTE CONTROL KEY (1-62, C13-C63)
   CHANNEL DISPLAYING WHEN PRESSING PREDETERMINED REMOTE CONTROL KEY (1-62, C13-C63)
   WHETHER OR NOT CHANNEL CORRESPONDING TO PREDETERMINED REMOTE CONTROL KEY IS SKIPPED
   WHEN USING UP-DOWN STATION SELECTION KEY
   FINE TUNE DATA USED FOR STATION SELECTION WHEN PRESSING PREDETERMINED REMOTE CONTROL KEY
DIGITAL BROADCAST (BS, CS110 DEGREES, TERRESTRIAL DIGITAL)
CHANNEL INDIVIDUAL SETTING
   WHETHER OR NOT SERVICE SELECTING STATION IS ASSIGNED WHEN PRESSING PREDETERMINED
   REMOTE CONTROL KEY
   SERVICE ID SELECTING STATION WHEN PRESSING PREDETERMINED REMOTE CONTROL KEY, WHEN ASSIGNED

Table 2 is a table showing necessary setting items for viewing broadcasts. Setting relating to an area such as an area code and a prefecture code, and individual setting of a terrestrial analog broadcast channel and individual setting of a digital broadcast channel in accordance with necessity are performed.

required for viewing a broadcast from the aforesaid second device is received, and when data corresponding to the requested data is set in a memory of the aforesaid first device, control of sending the aforesaid data set in the aforesaid memory to the aforesaid second device from the first device is conducted.

Further, there is provided a broadcast viewing system including a first device and a second device which are connected based on the HDMI standard, characterized in that a request signal for setting data required for viewing a broadcast from the aforesaid second device is received, and when data corresponding to the requested data is set in a memory of the aforesaid first device, control of sending the aforesaid data set in the aforesaid memory to the aforesaid second device from the first device is conducted.

According to the above described broadcast viewing system, when the second device makes request for receiving the data required for viewing a broadcast from the first device of the connection destination, the data corresponding to the request is transferred from the first device, and is stored in the second device.

It is preferable to include a remote control device which is used for the aforesaid second device, and has a request button for the setting data required for viewing, for sending the request signal for the setting data required for viewing a broadcast to the aforesaid first device. By only the operation of one request button of the remote control device, data setting operation for viewing in the second device can be started. The button may be provided in the remote control device on the first device side.

The setting data required for viewing the broadcast set in the aforesaid memory can include at least any one of data relating to an area, and data relating to individual setting of a channel of a broadcast. By setting these data, basic setting relating to viewing of the broadcast can be made.

It is preferable that as the aforesaid data relating to individual setting of the channel of the broadcast, a channel individual setting situation list including assignment setting of the channel to the aforesaid remote control key is created, and is stored in the aforesaid memory. It is preferable that a flag concerning whether or not user setting is made to the aforesaid remote control key is capable of being set in the aforesaid channel individual setting situation list.

For example, in the case of an analog broadcast, the number of channels and the number of number buttons 1 to 12 of the remote control key are substantially the same, and therefore, different channels can be respectively assigned to the remote control key. At this time, by adding a flag for discriminating whether user setting is made or not to each of number buttons, a mark for need of data transfer is provided at the time of data transfer. Specifically, based on the setting of the aforesaid flag, out of data stored in the aforesaid memory, only the aforesaid remote control key with the user setting being made is selected, and the data can be sent.

Combination of the aforesaid remote control key and a service ID corresponding to the channel of the broadcast may be capable of being set in the aforesaid channel individual setting situation list. For example, since the number of channels is large in the case of a digital broadcast, it is preferable to make it possible to set as the combination of the remote control key and the service IDs corresponding to the channels of a broadcast. It is preferable to make it possible to select the service ID by operation from the remote control at the time of data request. A flag concerning whether user setting is made or not to the combination of the aforesaid remote control key and the aforesaid service ID is capable of being set in the aforesaid channel individual setting situation list.

According to another aspect of the present invention, there is provided a first device in a broadcast viewing system including the first device and a second device which are connected based on the HDMI standard, characterized in that a request signal for setting data required for viewing a broadcast from the aforesaid second device is received, and when data corresponding to the requested data is set in a memory, control of sending the aforesaid data set in the aforesaid memory to the aforesaid second device is conducted. Further, there is provided a second device in a broadcast viewing system including a first device and the second device which are connected based on the HDMI standard, characterized in that a request signal for setting data required for viewing a broadcast is sent to the aforesaid first device, and when data corresponding to the requested data is set in a memory of the aforesaid first device, control of receiving the aforesaid data set in the memory and setting the aforesaid data in a memory of itself is conducted.

Further, the present invention may be a broadcast viewing system including a television receiver and a recording/reproducing device which are connected based on the HDMI standard, characterized in that a request signal for setting data from either of the aforesaid television receiver or the aforesaid recording/reproducing device is received, and when data corresponding to the requested data is set in a memory in a device of a request destination, control of sending the aforesaid data which is set to a device of a request source from the device of the request destination is conducted. It is preferable that by selecting a channel setting copy function from HDMI control function selection and pressing a decision button, on a menu screen of the aforesaid television receiver, data transfer processing based on a channel individual setting situation setting list is started.

Advantage of the Invention

According to the present invention, the setting operation for viewing can be simplified. Further, by providing the set flags, the data size at the time of transfer can be reduced.

DESCRIPTION OF SYMBOLS

A . . . digital broadcast receiver, B . . . DVD recorder, 1 . . . antenna, 3 . . . digital broadcast receiving part, 5 . . .

HDMI interface part, 7 . . . HDMI signal processing part, 11 . . . decoder, 15 . . . remote control photoreceptor, 17 . . . control part (CPU), 18 . . . storage part, 21 . . . speaker, 23 . . . display, 25 . . . audio signal processing part, 27 . . . video signal processing part, 41 . . . antenna, 43 . . . digital tuner, 45 . . . HDMI signal processing part, 47 . . . control part, 51 . . . remote control photoreceptor, 53 . . . storage part (HDD), 55 . . . HDMI interface part, 57 . . . electronic program table acquiring part, 63 . . . optical disk drive part, 67 . . . operation part

BEST MODE FOR CARRYING OUT THE INVENTION

Figure 1:
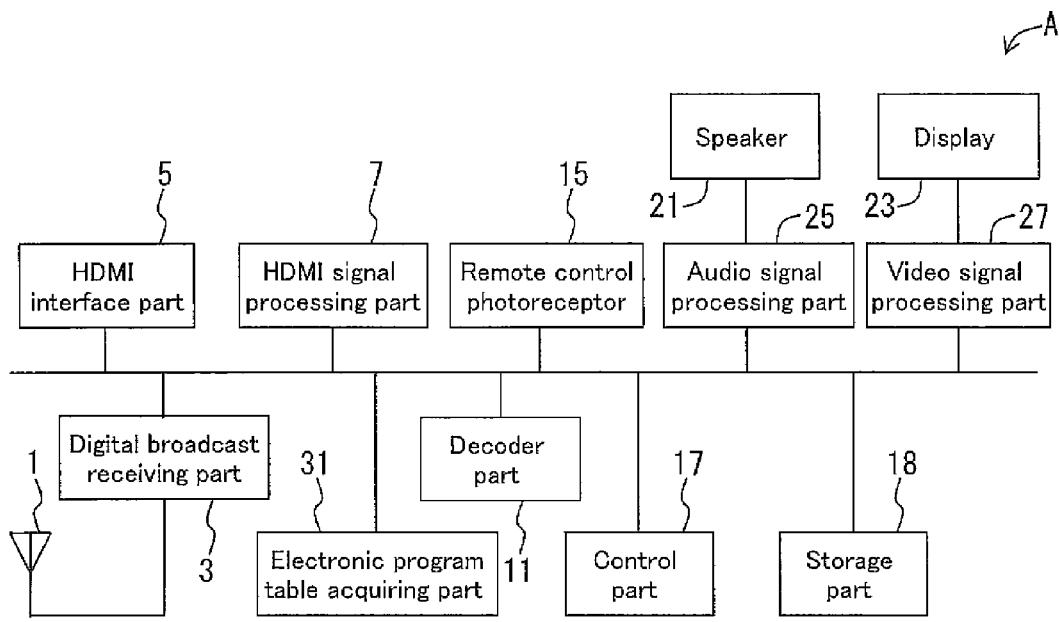
FIG. 1 is a functional block diagram showing one configuration example of a liquid crystal television device capable of receiving a digital broadcast which is one example of a connection source electronic device in a broadcast viewing system according to one embodiment of the present invention.
Figure 2:
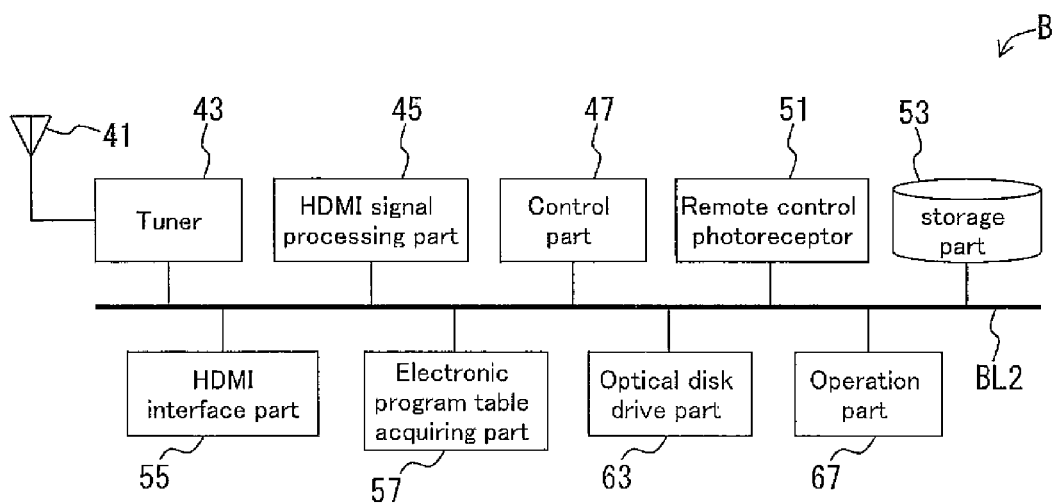
FIG. 2 is a functional block diagram showing one configuration example of a DVD recorder (recording/reproducing device) which is one example of a connection destination electronic device.
Figure 3:
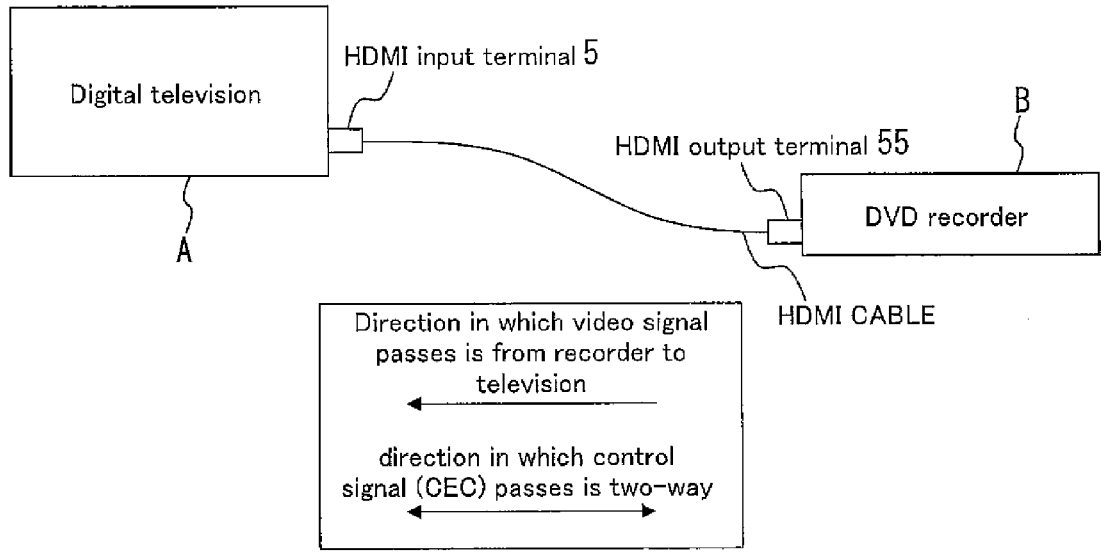
FIG. 3 is a diagram showing one configuration example of a broadcast viewing system according to the present embodiment.

Hereinafter, a broadcast viewing system according to an embodiment of the present invention will be described with reference to the drawings with an example of a system based on the HDMI standard. FIG. 3 is a diagram showing one configuration example of a broadcast viewing system according to the present embodiment. FIG. 1 is a functional block diagram showing one configuration example of a liquid crystal television device (hereinafter, called digital broadcast receiver) capable of receiving a digital broadcast which is an example of a connection source electronic device of the system shown in FIG. 3. FIG. 2 is a functional block diagram showing one configuration example of a DVD recorder (recording/reproducing device) which is one example of a connection destination electronic device of the system shown in FIG. 3.

The above described Table 1 shows examples of the CEC command (code). As shown in Table 1, the CEC commands include common codes in the HDMI standard and the unique code which is unique to a vender. Here, the vender unique codes include the codes relating to transfer of menu setting, program information, a special remote control key, detailed error information and the like. More specifically, the reservation function of the recorder allows setting with the degree of freedom by a vender.

As shown in FIG. 1, a digital broadcast receiver A has an antenna 1, a digital broadcast receiving part 3 including a tuner of a digital broadcast, an HDMI interface part 5, an HDMI signal processing part 7, a decoder 11, a remote control photoreceptor 15, an audio signal processing part 25 which performs processing of an audio signal, a speaker 21 which outputs sound based on the audio signal after processing, a video signal processing part 27 which performs processing a video signal, a display 23 which outputs video based on the video signal after processing, a control part (CPU) which controls each of these function blocks through a bus line, and a storage part 18 which stores a program for performing the following processing and the other information.

As shown in FIG. 2, a DVD recorder B has an antenna 41, a digital tuner 43, an HDMI signal processing part 45, a control part 47, a remote control photoreceptor 51, a storage part (HDD) 53, an HDMI interface part 55, an electronic program table acquiring part 57, an optical disk drive part 63 such as a DVD, and an operation part 67.

FIG. 3 is a diagram showing a state in which the HDMI input terminal 5 of the digital broadcast receiver A and the HDMI output terminal 55 of the DVD recorder B shown in FIG. 1 and FIG. 2 are connected by the HDMI cable. A video signal flows to the digital broadcast receiver A from the DVD recorder B as shown by the arrow, between the digital broadcast receiver A and the DVD recorder B, and a control signal (CEC code) flows in both directions between the digital broadcast receiver A and the DVD recorder B. Control processing between the devices can be performed based on exchange of the control signal of the CEC code through the HDMI cable which can perform two-way communication between the devices.

Figure 4:
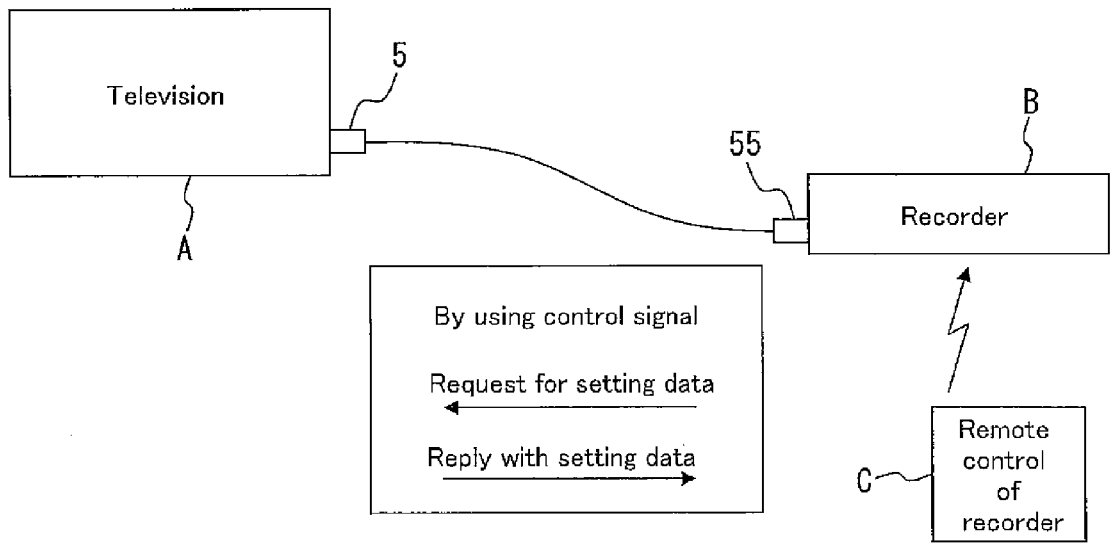
FIG. 4 is a diagram showing one configuration example of a broadcast viewing system according to the present embodiment, and corresponding to FIG. 3, and is a diagram showing an example in which a television receiver A and a recording/reproducing device B are connected by the HDMI cable as an example.

FIG. 4 is a diagram showing one configuration example of a digital device system according to the present embodiment and corresponding to FIG. 3, and as an example, the television receiver A and the recording/reproducing device B are connected by the HDMI cable. In this example, setting data is requested by using a control signal from the memory reproducing device B side by using a remote control device C on the memory reproducing device B side, and subsequently, the television receiver A replies with the setting data by a control signal to the recording/reproducing device B by using the data set in the television receiver A side in advance through the HDMI cable. The remote control device C preferably has an exclusive button (for example, a request button for the channel setting data) for sending the request signal for the channel setting data to the television receiver B which is a connection source device, though not illustrated. Similarly, the remote control on the television receiver A side may be also provided with a similar button.

As a mode different from the mode in FIG. 4, the setting data is requested by using a control signal from the television receiver A side by using the remote control device on the television receiver A side, and subsequently, the recording/reproducing device B can also reply with the setting data by the control signal by using the data set in the recording/reproducing device B side in advance through the HDMI cable to the television receiver A. It is preferable to make both the methods possible.

Hereinafter, the content of the processing of channel setting will be described more concretely. The contents of these tables are stored in, for example, the storage part 18 (FIG. 1) and the storage part 53 (FIG. 2).

TABLE 3

TERRESTRIAL ANALOG BROADCAST CHANNEL INDIVIDUAL SETTING (TV SIDE)

| | | | | | |
|---|---|---|---|---|---|
| REMOTE CONTROL KEY | 1 | 2 | 3 | ... | 12 |
| STATION SELECTION CHANNEL | 1 | 2 | ... | ... | ... |
| DISPLAY CHANNEL | 1 | 2 | ... | ... | ... |
| SKIP SETTING | Not Skip | Skip | ... | ... | ... |
| FINE TUNE DATA | ±0 | ±0 | ... | ... | ... |
| SET FLAG | UNSET | SET | ... | ... | ... |

TABLE 4

TERRESTRIAL ANALOG BROADCAST CHANNEL INDIVIDUAL SETTING SITUATION LIST (TV SIDE)

| REMOTE CONTROL KEY | SETTING SITUATION (TV SIDE) |
|---|---|
| 1 | DEFAULT VALUE |
| 2 | SET |
| 3 | DEFAULT VALUE |
| . | . |
| . | . |
| 12 | SET |

TABLE 5

DIGITAL BROADCAST (BS, CS110 DEGREES, TERRESTRIAL DIGITAL) CHANNEL INDIVIDUAL SETTING

| NETWORK CLASSIFICATION | BS | | | | | | CS110 DEGREES | TERRESTRIAL DIGITAL | |
|---|---|---|---|---|---|---|---|---|---|
| REMOTE CONTROL KEY | 1 | 2 | 3 | 4 | ... | 12 | ... | ... | ... |
| SERVICE ID | 101 | x | 102 | 103 | ... | x | ... | ... | ... |
| SET FLAG | DEFAULT | SET | SET | UNSET | ... | UNSET | ... | ... | ... |

TABLE 6

DIGITAL BROADCAST (BS, CS110 DEGREES, TERRESTRIAL DIGITAL) CHANNEL INDIVIDUAL SETTING SITUATION LIST
NETWORK CLASSIFICATION = BS

| REMOTE CONTROL KEY | SETTING SITUATION |
|---|---|
| 1 | DEFAULT VALUE |
| 2 | SET |
| . | . |
| . | . |
| . | . |
| 11 | SET |
| 12 | UNSET |

Table 3 is the channel individual setting of the terrestrial analogue broadcast, and is the table showing an example of the setting content in the television receiver side, for example. In the example shown in Table 3, when the remote control keys are "1" to "12", the station selection channels (1 to 62, C13 to 63), the display channels (1 to 62, C13 to 63), the skip setting (skip or not skip), fine tune data (fine tune of frequency) and set flag (unset or set, "0" or "1" may be suitable) which are assigned to the respective remote control keys 1 to 12 are set by setting by a user or automatic setting.

Table 4 is the table showing an example of the channel individual setting situation list of the terrestrial analog broadcast. Here, how the setting is made on the television receiver side is shown. As shown in Table 4, whether the default value or already set is shown with respect to the remote control keys 1 to 12, as the setting situation. By tabling the setting situation like this, it can be easily discriminated whether setting is made at the television receiver side or the one of the default value when a request is sent from the recording/reproducing device side. When the request of transfer of the setting data is sent from the recording/reproducing side, the data size to be transferred can be made small by transferring only the set items. Alternatively, by limiting the request from the recording/reproducing device side to the request corresponding to the remote control key which is already set by sending the data shown in Table 4 to the recording/reproducing device side, the communication amount can be made small, and the time required for communication can be made short.

Table 5 is the table of the digital broadcast (BS, CS110 degrees, terrestrial digital) channel individual setting, and the table corresponding to Table 3. Table 6 is the digital broadcast (BS, CS110 degrees, terrestrial digital) channel individual setting situation list, and is the table corresponding to Table 4. Table 5 shows an example of BS as the network classification, but the table also includes similar data about CS, and terrestrial digital. Tables 5 and 6 are the similar tables to Tables 3 and 4, and therefore, explanation of them will be omitted.

Figure 5:
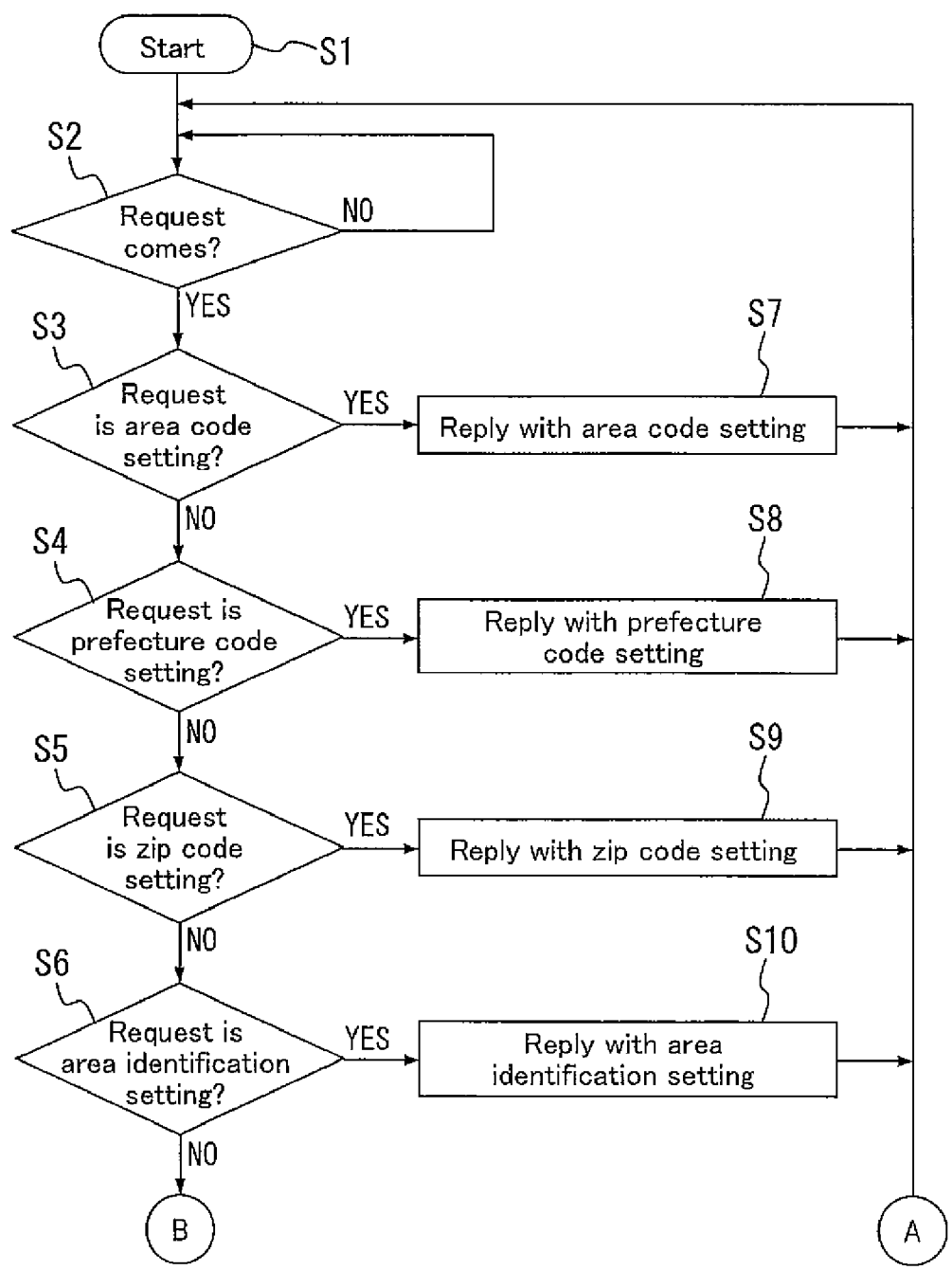
FIG. 5 is a flowchart showing a flow of processing seen from a television receiver side.
Figure 6:
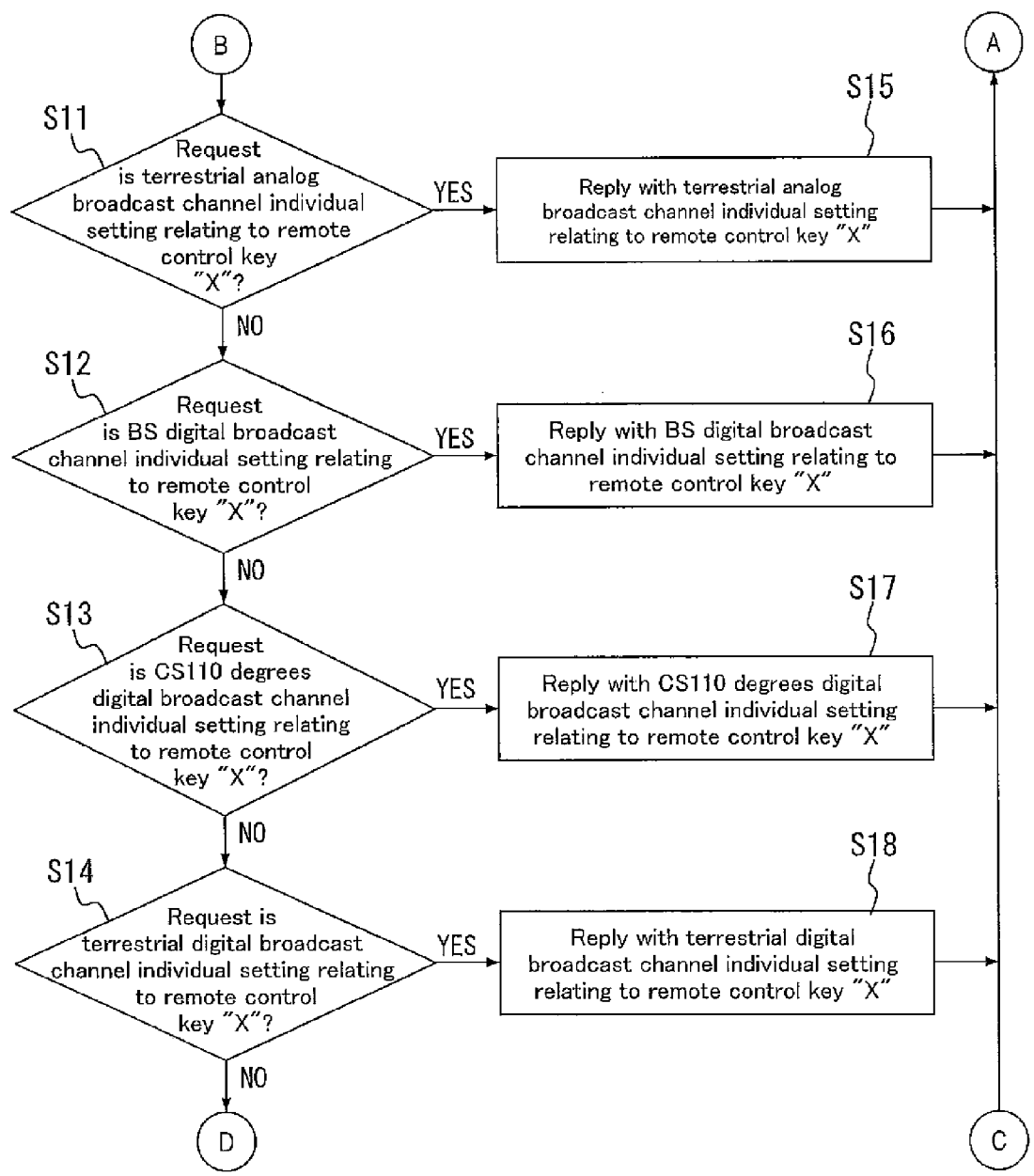
FIG. 6 is a flowchart showing the flow of the processing seen from a television receiver side.
Figure 7:
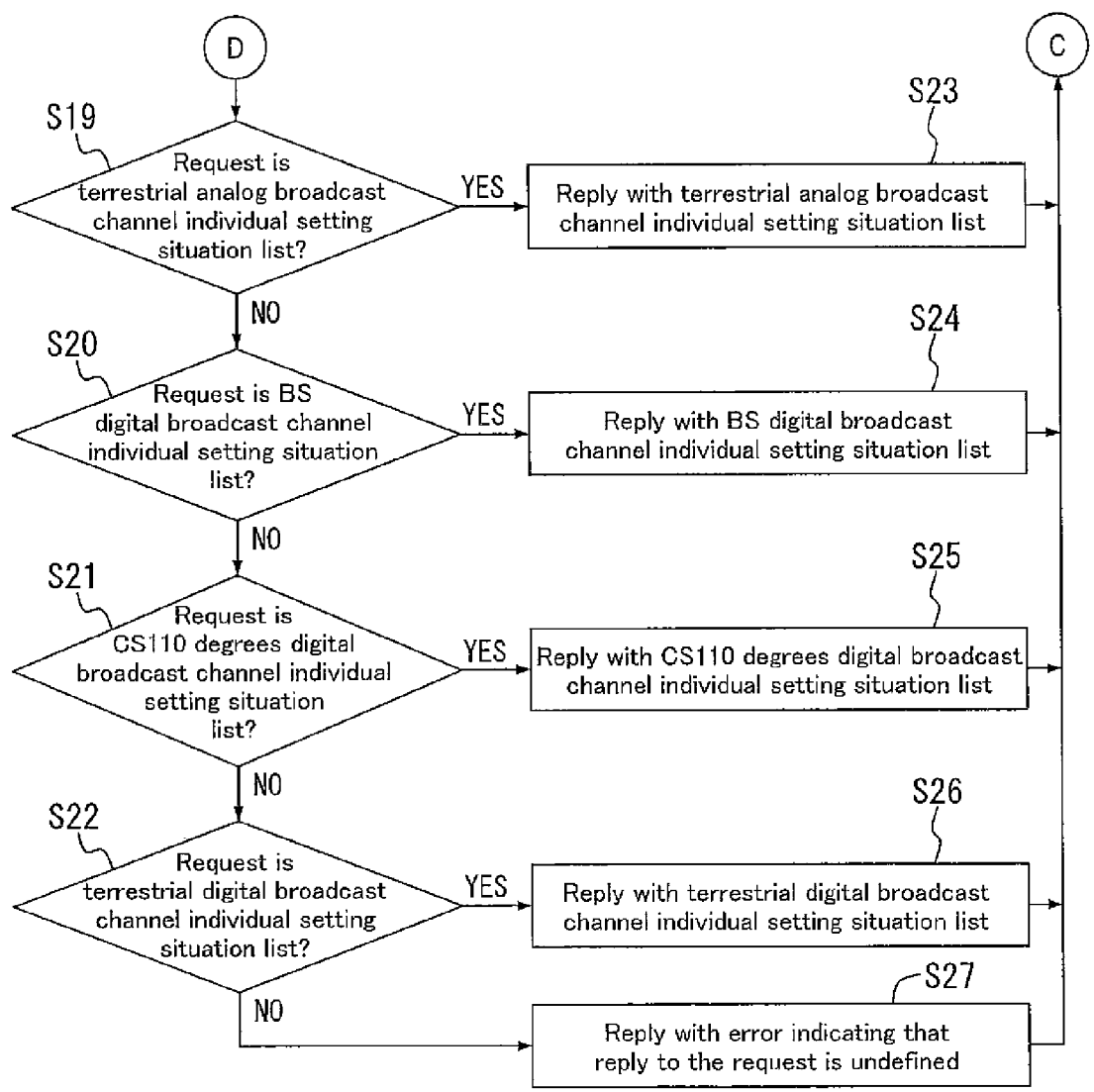
FIG. 7 is a flowchart showing the flow of the processing seen from the television receiver side.
Figure 8:
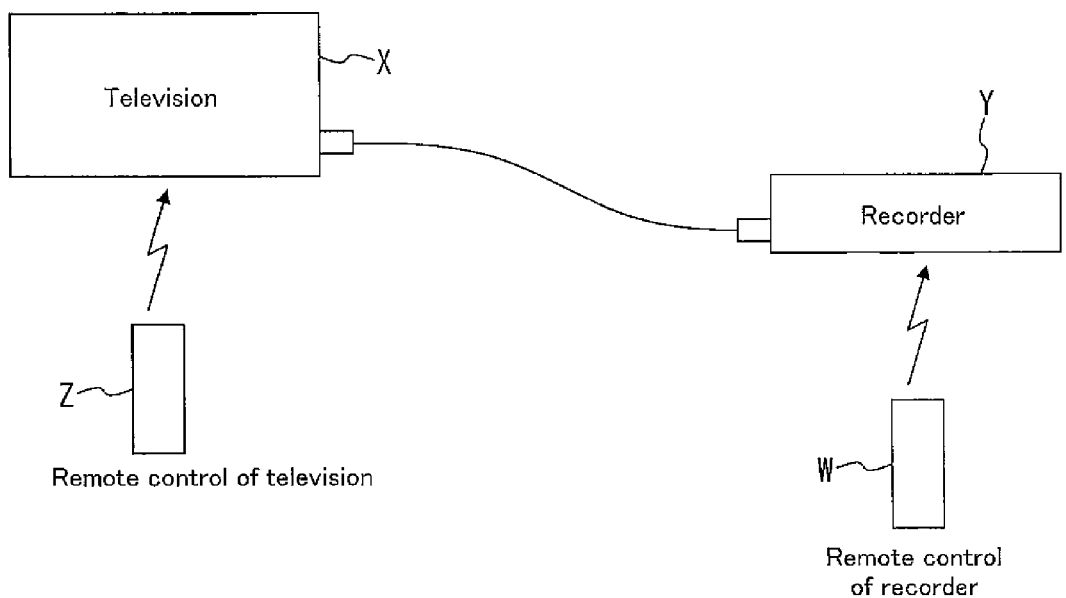
FIG. 8 is a diagram showing a general channel setting method in the case of connecting a digital broadcast receiver and a recording/reproducing device by the HDMI cable and viewing a program.

Next, the flow of the processing in the setting situation shown in these tables will be described with reference to the drawings. FIGS. 5 to 7 are flowcharts showing the flow of the processing seen from the television receiver side. For example, when in the menu display screen of the television, the channel setting copy function is selected in the HDMI control function selection and a decision button is pressed, the following processing is started.

The processing is started in step S1, and in step S2, it is determined whether or not a request comes from the recording/reproducing device side to the television receiver, for example. When the request comes (YES), the flow goes to step S3, and it is asked whether or not the request is area code setting, and the television receiver replies with area code setting to the recording/reproducing device (step S7). In the case of NO in step S3, the flow goes to step S4, and it is determined whether the request is prefecture code setting. When the request is the prefecture code (Yes), the television receiver replies with the prefecture code setting to the recording/reproducing device in step S8.

In the case of NO in step S4, the flow goes to step S5, and it is determined whether the request is zip code setting. When the request is the zip code setting (Yes), the television receiver replies with the zip code setting to the recording/reproducing device in step S9. In the case of NO in step S5, the flow goes to step S6, and it is determined whether the request is area identification setting. When the request is the area identification setting (Yes), the television receiver replies with the area identification setting to the recording/reproducing device in step S10. After the reply, the flow returns to step S2. The same will apply hereinafter.

Next, in the case of NO in step S6, the flow goes to step S11, and it is determined whether the request is terrestrial analog broadcast channel individual setting relating to a remote control key "X". When the request is the terrestrial analog broadcast channel individual setting (Yes), the television receiver replies with the terrestrial analog broadcast channel individual setting to the recording/reproducing device in step S15. In the case of NO in step S11, the flow goes to step S12, and it is determined whether the request is BS digital broadcast channel individual setting relating to the remote control key "X". When the request is the BS digital broadcast channel individual setting (Yes), the television receiver replies with the BS digital broadcast channel individual setting to the recording/reproducing device in step S16.

Next, in the case of NO in step S12, the flow goes to step S13, and it is determined whether the request is CS110 degrees digital broadcast channel individual setting relating to the remote control key "X". When the request is the CS110 degrees digital broadcast channel individual setting (Yes), the television receiver replies with the CS110 degrees digital broadcast channel individual setting to the recording/reproducing device in step S17. In the case of NO in step S13, the flow goes to step S14, and it is determined whether the request is terrestrial digital broadcast channel individual setting relating to the remote control key "X". When the request is the terrestrial digital broadcast channel individual setting (Yes), the television receiver replies with the terrestrial digital broadcast channel individual setting to the recording/reproducing device.

In the case of NO in step S14, the flow goes to step S19, and it is determined whether or not the request is terrestrial analog broadcast channel individual setting situation list. When the request is the terrestrial analog broadcast channel individual setting situation list (Yes), the television receiver replies with the terrestrial analogue broadcast channel individual setting situation list to the recording/reproducing device. In the case of NO in step S19, the flow goes to step S20, and it is determined whether or not the request is BS broadcast channel individual setting situation list. When the request is the BS broadcast channel individual setting situation list (Yes), the television receiver replies with the BS broadcast channel individual setting list to the recording/reproducing device in step S24.

In the case of NO in step S20, the flow goes to step S21, and it is determined whether or not the request is a CS110 degrees digital broadcast channel individual setting situation list. When the request is the CS110 degrees digital broadcast channel individual setting situation list (Yes), the television device replies with the CS110 degrees digital broadcast channel individual setting situation list to the recording/reproducing device in step S25. In the case of NO in step S21, the flow goes to step S22, and it is determined whether or not the request is a terrestrial digital broadcast channel individual setting situation list. When tlie request is the terrestrial digital broadcast channel individual setting situation list (Yes), the television receiver replies with the terrestrial digital broadcast channel individual setting situation list to the recording/reproducing device. In the case of NO in step S22, the flow goes to step S27, and reply with an error indicating that the reply to the request is undefined.

As described above, according to the present embodiment the television receiver receives the request from the recording/reproducing device, and makes the reply based on the contents described based on the above described tables, whereby the setting on the television receiver side can be reflected on the recording/reproducing device side.

INDUSTRIAL APPLICABILITY

The present invention is applicable to a broadcast viewing system.

The invention claimed is:

1. A broadcast viewing system, comprising:
a first device and a second device which are capable of two-way communication, wherein
the first device is configured to receive a request signal from the second device for setting data required for viewing a broadcast from said second device,
the first device is further configured to discriminate whether data corresponding to the requested data is set in a memory of said first device or not,
if the data corresponding to the requested data is set in said memory of said first device, the system controls sending from said first device only data set in said memory of said first device to said second device from the first device,
said memory of said first device stores data relating to individual setting of a channel of a broadcast as setting data required for viewing said broadcast,
said data relating to individual setting of the channel of the broadcast is constructed by
a list of individual setting situations of the channel of a combination of
a remote control key ID and
a setting situation flag indicating whether user setting is performed or not, and
based on whether the setting situation flag is set or not with respect to the remote control key ID in the list of individual setting situations of the channel, only the data of remote control key ID with the user setting among the data in the memory is sent to the second device.

2. A broadcast viewing system, comprising:
a first device; and
a second device connected to the first device based on the HDMI standard, wherein
a request signal for setting data required for viewing a broadcast from said second device is received by the first device from the second device, and discriminated whether data corresponding to the requested data is set in a memory of said first device or not,
if the data corresponding to the requested data is set in said memory of said first device, the system controls of sending from said first device said data set in said memory of said first device to said second device from the first device,
said memory of said first device stores data relating to individual setting of a channel of a broadcast as setting data required for viewing said broadcast,
said data relating to individual setting of the channel of the broadcast is constructed by
a list of individual setting situations of the channel of a combination of
a remote control key ID and
a setting situation flag indicating whether user setting is performed or not, and
based on whether the setting situation flag is set or not with respect to the remote control key ID in the list of individual setting situations of the channel, only the data of remote control key ID with the user setting among the data in the memory is sent to the second device.

3. The broadcast viewing system according to claim 1, further comprising a remote control device which is used for said second device, and has a request button for the setting data required for viewing, for sending the request signal for the set data required for viewing a broadcast to said first device.

4. The broadcast viewing system according to claim 1, further comprising
a remote control device which is used for said first device, and has a request button for the setting data required for viewing, for sending the request signal for the set data required for viewing a broadcast to said second device.

5. The broadcast viewing system according to claim 1, wherein
the set data required for viewing a broadcast, which is set in said memory, comprises at least any one of data relating to an area, and data relating to individual setting of a channel of a broadcast.

6. The broadcast viewing system according to claim 5, wherein
as said data relating to individual setting of the channel of the broadcast, a channel individual setting situation list comprising assignment setting of the channel to said remote control key is created and is stored in said memory.

7. The broadcast viewing system according to claim 6, wherein
a flag concerning whether user setting is made to said remote control key or not is capable of being set in said channel individual setting situation list.

8. The broadcast viewing system according to claim 7, wherein
based on the setting of said flag, out of the data stored in said memory, only said remote control key with the user setting being made is selected to send data.

9. The broadcast viewing system according to claim 6, wherein
combination of said remote control key and a service ID corresponding to the channel of a broadcast is capable of being set in said channel individual setting situation list.

10. The broadcast viewing system according to claim 9, wherein
a flag concerning whether user setting is made or not to the combination of said remote control key and said service ID is capable of being set in said channel individual setting situation list.

11. The broadcast viewing system according to claim 9, wherein
based on the setting of said flag, out of data stored in said memory, only the combination of said remote control key and said service ID with the user setting being made is selected to send data.

12. A first device in a broadcast viewing system comprising the first device and a second device which are connected based on the HDMI standard, wherein
a request signal for setting data required for viewing a broadcast from said second device is received by the first device from the second device, and discriminated whether data corresponding to the requested data is set in a memory of said first device or not,
if the data corresponding to the requested data is set in said memory of said first device, the system controls sending from said first device only said data set in said memory of said first device to said second device,
said memory of said first device stores data relating to individual setting of a channel of a broadcast as setting data required for viewing said broadcast,
said data relating to individual setting of the channel of the broadcast is constructed by
a list of individual setting situations of the channel of a combination of
a remote control key ID and
a setting situation flag indicating whether user setting is performed or not, and
based on whether the setting situation flag is set or not with respect to the remote control key ID in the list of individual setting situations of the channel, only the data of remote control key ID with the user setting among the data in the memory is sent to the second device.

13. A broadcast viewing system comprising a television receiver and a recording/reproducing device which are connected based on the HDMI standard, wherein
a request signal for setting data transmitted from one of said television receiver or said recording/reproducing device is received by the other of said television receiver or said recording/reproducing device, and discriminated whether data corresponding to the requested data is set in a memory in the other of said television receiver or said recording/reproducing device or not,
if the data corresponding to the requested data is set in said memory of said other of said television receiver or said recording/reproducing device, the system controls sending said data from the other of said television receiver or said recording/reproducing device, which is set, to the one of said television receiver or said recording/reproducing device,
said memory stores data relating to individual setting of a channel of a broadcast as setting data required for viewing said broadcast,
said data relating to individual setting of the channel of the broadcast is constructed by
a list of individual setting situations of the channel of a combination of
a remote control key ID and
a setting situation flag indicating whether user setting is performed or not, and
based on whether the setting situation flag is set or not with respect to the remote control key ID in the list of individual setting situations of the channel, only the data of remote control key ID with the user setting among the data in the memory is sent to the one of said television receiver or said recording/reproducing device.

14. The broadcast viewing system according to claim 13, wherein
by selecting a channel setting copy function from HDMI control function selection and pressing a decision button, on a menu screen of said television receiver, data transfer processing based on a channel individual setting situation setting list is started.

15. The broadcast viewing system according to claim 2, further comprising a remote control device which is used for said second device, and has a request button for the setting data required for viewing, for sending the request signal for the set data required for viewing a broadcast to said first device.

16. The broadcast viewing system according to claim 2, further comprising
a remote control device which is used for said first device, and has a request button for the setting data required for viewing, for sending the request signal for the set data required for viewing a broadcast to said second device.

17. The broadcast viewing system according to claim 2, wherein
the set data required for viewing a broadcast, which is set in said memory, comprises at least any one of data relating to an area, and data relating to individual setting of a channel of a broadcast.

18. The broadcast viewing system according to claim 3, wherein
the set data required for viewing a broadcast, which is set in said memory, comprises at least any one of data relating to an area, and data relating to individual setting of a channel of a broadcast.

19. The broadcast viewing system according to claim 4, wherein
the set data required for viewing a broadcast, which is set in said memory, comprises at least any one of data relating to an area, and data relating to individual setting of a channel of a broadcast.

20. The broadcast viewing system according to claim 1, wherein
said first device stores a setting situation of setting data required for viewing said broadcast as a table, and sends data stored as the table to the second device.

* * * * *